Sept. 6, 1949.  J. P. LANNEN  2,481,125
TIRE CARRIER FOR BALANCING MACHINES
Filed June 2, 1948  2 Sheets-Sheet 1

INVENTOR.
Joseph P. Lannen
BY
J.S. Murray
ATTORNEY

Sept. 6, 1949.　　　　　J. P. LANNEN　　　　　2,481,125
TIRE CARRIER FOR BALANCING MACHINES
Filed June 2, 1948　　　　　　　　　　　　　　2 Sheets-Sheet 2

INVENTOR.
Joseph P. Lannen
BY
ATTORNEY

Patented Sept. 6, 1949

2,481,125

UNITED STATES PATENT OFFICE 2,481,125

TIRE CARRIER FOR BALANCING MACHINES

Joseph P. Lannen, Detroit, Mich., assignor to Micro-Poise Engineering and Sales Company, Detroit, Mich., a partnership Application June 2, 1948, Serial No. 30,609

15 Claims. (Cl. 73—66)

This invention relates to tire balancing machines and particularly to work carriers for such machines.

A commonly used machine for testing tires employs an annular carrier formed by a pair of shoes on which a tire may be set, a provision being made for spreading said shoes into firm clamping engagement with the tire beads, so as to impart to the tire a true circular form. It is important for test purposes that a uniform cross sectional shape be imparted to the tube-receiving chamber of a tire, this being particularly vital with respect to tires having a considerable free flexibility. The modern trend toward low inflation pressures, particularly as regards tires of large tread diameters, detracts materially from tire stiffness. For balance testing purposes, it has been recognized that the stiffness of a tire may be considerably increased by maintaining a suitable spaced relation of the tire beads in their engagement with a carrier, but a provision heretofore made for that purpose has unduly increased the time and skill requisite to a testing operation.

An object of the invention is to equip the work carrier of a tire balancing machine with such supports for the upper bead of a tire, as will effect a desired spacing of the tire beads, without adding to the time or skill involved in operating the machine.

Another object is to equip the carrier with a set of supports for the upper bead of a tire, such supports being normally retracted to clear the lower bead and automatically assuming projected positions subsequent to such clearance.

Another object is to provide means on said carrier for projecting said upper bead supports, such means being actuable by the lower beads in approaching their seats on the carrier.

Another object is to equip a tire carrier with levers having upper arms carrying supports for upper bead of a tire and having lower arms actuable by the lower bead to project said supports to their use positions.

These and various other objects are attained by the construction hereinafter described and illustrated in the accompanying drawings, wherein.

Figure 1:
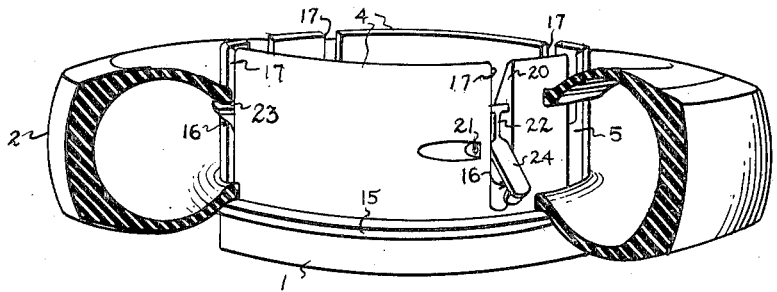
Fig. 1 is a perspective view of a tire carrier incorporating the present improvements.

In these views, the reference character 1 designates a circular plate adapted to mount a tire 2 for balance testing purposes. Said plate is centrally formed with an upstanding hub 3, receiving any universally pivotal means (not shown), such means being no feature of the present invention.

Figure 2:
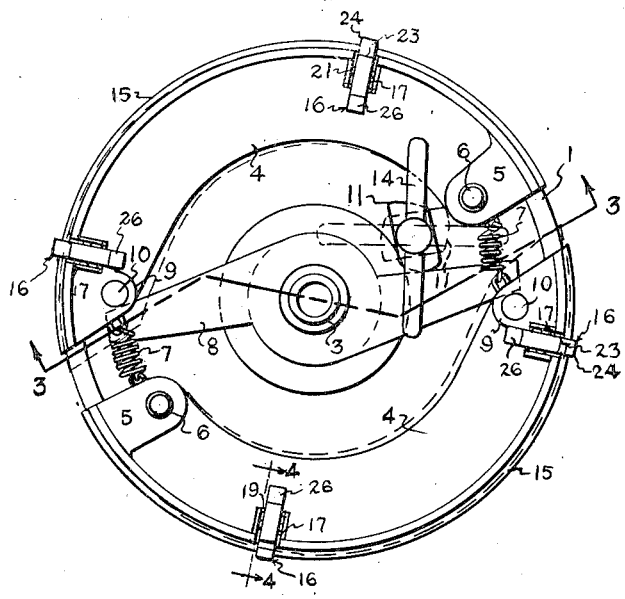
Fig. 2 is a top plan view of said carrier showing mechanism for expanding the shoes of the carrier.
Figure 3:
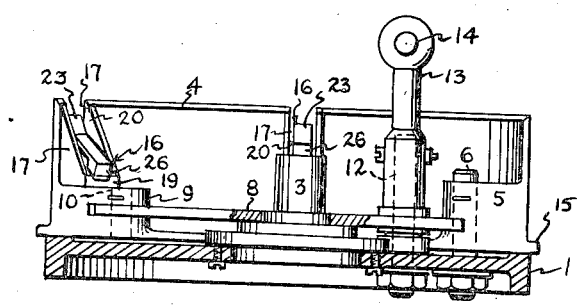
Fig. 3 is an axial vertical sectional view of the same, taken on the line 3—3 of Fig. 2.

A pair of substantially semi-circular tire-clamping shoes 4 are disposed in complementary relation on the plate 1, to swing to and from its axis. Thus said shoes are formed at relatively reversed ends thereof with inwardly projecting lugs 5, which engage pivot pins 6 rigidly upstanding from the plate. The free end of each shoe is connected to and urged toward the pivoted end of the companion shoe by a coiled spring 7, whereby the shoes are normally retracted to the dash line positions, shown in Fig. 2. Centrally journaled on the nub 3 and seated on a shoulder thereof, is a double-armed lever 8 for expanding the shoes, the latter having inwardly projecting lugs 9 on their free ends in which pins 10 are vertically mounted for engagement by the lever extremities. Preferably the lugs 9 have horizontal slots in which said extremities travel to engage and disengage the pins 10. For actuating the lever, an edge thereof is engaged by a cam 11 adapted to rock on a pin 12 rigidly upstanding from the plate 1. An actuating shank 13 for the cam extends upwardly from its center, the lower portion of said shank having a socket to accommodate the pin, and a handle 14 being attached to the upper end of the shank.

Figure 4:
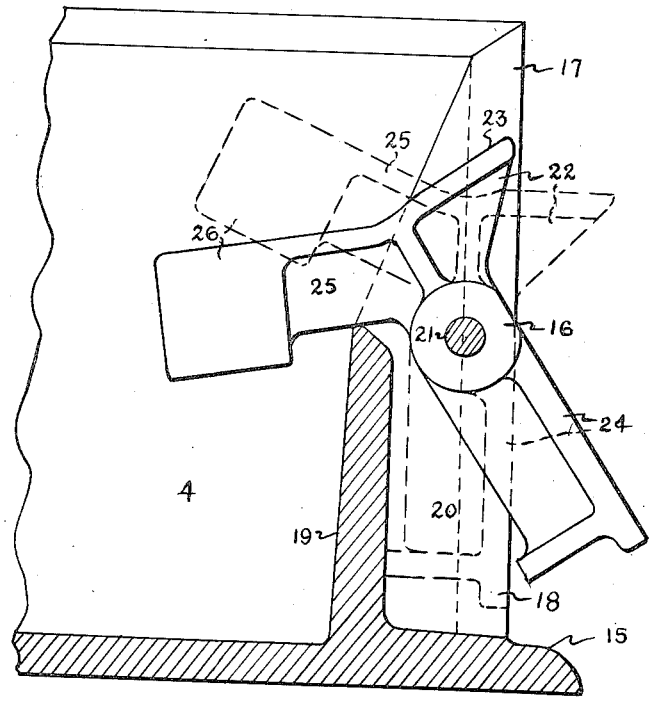
Fig. 4 is an enlarged view, sectionally taken on the line 4—4 of Fig. 2, and showing one of the upper bead supporting levers in side elevation.

The shoes 4 are similarly formed at their lower edges with outwardly projecting ribs 15, coextensive with said shoes and jointly forming a seat for the lower bead of the tire 2. To seat the upper bead of said tire and assure a desired considerable spacing of the beads, a suitable number of levers 16 are mounted on each shoe, two being shown. These levers occupy slots 17 extending downwardly from the upper margins of the shoes, the lower portions of the levers being accommodated in pockets 18 forming extensions of said slots and opening from the tire-clamping faces of the shoes. Each pocket comprises a rear wall 19 and substantially parallel side walls 20 having extensions bordering the slots 17 and coextensive with the latter. Fulcrum pins 21 for the levers are disposed transversely to the slots 17 just above the pockets 18, being carried by the walls 20. Each lever comprises an upwardly extending arm 22 terminating in a seat 23 for the upper bead of a tire, and a downwardly extending and relatively long arm 24 which is preferably transverse to the seat 23. There is also integral with each lever an arm 25 extending inwardly from the arm 22 at an upward inclination and terminating in a weight 26. The effect of said weight is to bias the lever toward the position shown in full lines in Fig. 4, the weight arm engaging the wall 19, the arm 22 being retracted into the slot 17, and the arm 24 extending outwardly from the shoe at a divergency thereto of approximately sixty degrees. In the other limiting position of each lever, shown in dash lines in Fig. 4, the weight arm is raised, the seat 23 is exposed outwardly of the shoe, and the arm 24 lies fully within the pocket 18, abutting the rear wall thereof.

In use of the described carrier, the shoes 4 are held retracted by the springs 7 when a tire is applied to said shoes, the cam 11 then being clear of the lever 8, all as shown in dash lines in Fig. 1. Thus the tire may be freely slipped over the annulus formed by said shoes. When the tire is in place, the operator gives the handle 14 substantially a quarter turn, applying the cam 11 to the lever 8 and acting through the latter on the free ends of the shoes to expand the latter into firm engagement with the tire. There is no novelty in this control mechanism for the shoes.

Figure 5:
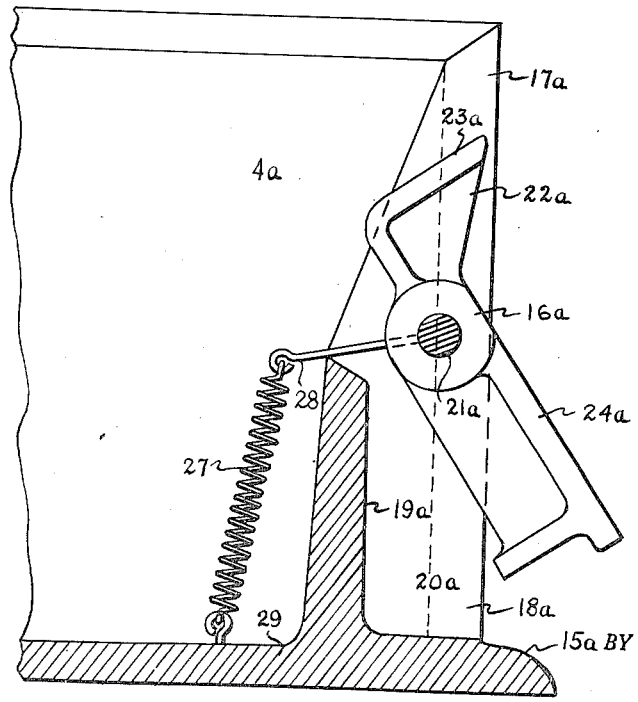
Fig. 5 is a view similar to Fig. 4 but showing a coiled spring acting on the lever to replace a weight shown in the preceding views.

Since the seats 23 are retracted by the weights 26 when a tire is slipped over the shoes, the lower or leading bead of the tire meets no obstruction until the outwardly projecting arms 24 are encountered. The weight of the tire sufficiently exceeds the several weights 26 to immediately rock the levers 16 to their dash line positions of Fig. 4, projecting the seats 23 into the path of the upper or trailing bead of the tire. Thus the last-mentioned bead is held raised in opposition to tire weight and to the contractive stress of the tire, while the lower bead settles to its seat on the ribs 15. This result, it is to be noted, requires no special manipulation of the tire which is applied just as rapidly and easily as it would be in the absence of the levers 16. Removal of a tire, after retraction of the shoes, is also in no way impeded by the levers 16 since the seats 23 are retracted promptly by the weights 26 when the lower bead of the tire is raised clear of the arms 24. The modification illustrated in Fig. 5 conforms to the preceding description except that no weight or weight arm is formed on the lever, the normal position of the latter being established by a coiled spring 27 extending from a pin 28 fixed on the lever hub to a flange 29 interiorly formed on the shoe.

In interpreting the following claims it is to be observed that the levers 16 function independently of the adaptability of the annulus formed by the shoes 4 to be expanded and contracted. Also, the invention as disclosed in Fig. 5, does not require the axis of the shoes to be substantially vertical, as in the other illustrated type of carrier, but is effective regardless of the direction of said axis.

What I claim is:

1. A tire carrier for a balancing machine, comprising an annulus proportioned to be embraced by a tire and having its axis substantially vertical, a support on said annulus for the upper bead of a tire applied to the carrier, such support being retractible into the annulus, and control means disposed at a lower level than said support, and normally projecting outwardly from the annulus and retractible by the lower bead of an applied tire for projecting the support responsive to retraction of said means.

2. In a tire carrier for a balancing machine as set forth in claim 1, means copivotally mounting said support and control means on the annulus to afford their specified retractability.

3. In a tire carrier for a balancing machine as set forth in claim 1, means biasing said support toward its retracted position.

4. In a tire carrier for a balancing machine as set forth in claim 1, a weight biasing said support toward its retracted position.

5. In a tire carrier for a balancing machine as set forth in claim 1, a weight biasing said support toward its retracted position, and means copivotally mounting said support, control means and weight on the annulus, affording the specified retractability of the support and control means.

6. A tire carrier for a balancing machine as set forth in claim 1, said annulus being slotted downwardly from its upper edge to accommodate said support and control means.

7. A tire carrier for a balancing machine as set forth in claim 1, said annulus having a pocket receiving said control means.

8. In a tire carrier for a balancing machine as set forth in claim 1, said annulus having a slot accommodating said support and control means, a pivot member for said support bridged across said slot.

9. A tire carrier for a balancing machine comprising an annulus proportioned to be embraced by a tire and having its axis substantially vertical, a support on said annulus for the upper bead of a tire applied to the carrier, such support being retractible into the annulus, means biasing said support toward its retracted position, and means actuable by the lower bead of said tire for projecting said support.

10. A tire carrier for a balancing machine comprising an annulus proportioned to be embraced by a tire and having its axis substantially vertical, a lever fulcrumed on said annulus and having its fulcrum axis substantially tangential to the annulus, said lever comprising arms above and below its fulcrum, and a support on the upper arm for the upper bead of a tire applied to the annulus, said support being retractible into the annulus through rocking of the lever, the lower arm being exposed outwardly of the annulus when the support is retracted, whereby engagement of the lower bead of a tire with said lower arm, projects said bead support to its support-forming position.

11. In a tire carrier for a balancing machine as set forth in claim 10, means biasing said lever to its position retracting said support.

12. In a tire carrier for a balancing machine as set forth in claim 10, a weighted arm on said lever, within the annulus, biasing the lever to its position retracting said support.

13. A tire carrier for a balancing machine comprising an annulus adapted to be embraced by a tire, and means for spreading the tire beads, including a control element mounted on said annulus and normally outwardly projecting from the annulus to be abutted by the leading bead of a tire as the latter is applied to the annulus, said element being retractible into the annulus by the tire, and further including an abutment for the trailing bead of the tire, normally retracted within the annulus and movable to project outwardly from the annulus, said control element and abutment being interconnected for actuating the abutment outwardly as the control element is retracted.

14. In a tire carrier for a balancing machine as set forth in claim 13, a spring effective on said spreading means to normally retract the abutment and project the control element.

15. In a tire carrier for a balancing machine as set forth in claim 13, means for biasing the abutment toward its retracted position and for biasing the control element toward its projected position.

JOSEPH P. LANNEN.

REFERENCES CITED

The following references are of record in the file of this patent:

UNITED STATES PATENTS

| Number | Name | Date |
|---|---|---|
| 2,301,958 | Lannen | Nov. 17, 1942 |